UNITED STATES PATENT OFFICE.

ANDREW THOMA, OF CAMBRIDGE, MASSACHUSETTS, ASSIGNOR TO NORTH AMERICAN CHEMICAL COMPANY, OF PORTLAND, MAINE, A CORPORATION OF MAINE.

SHOE-BOTTOM FILLER.

1,137,679.                    Specification of Letters Patent.    Patented Apr. 27, 1915.

No Drawing.        Application filed January 6, 1913. Serial No. 740,417.

*To all whom it may concern:*

Be it known that I, ANDREW THOMA, a citizen of the United States, and resident of Cambridge, county of Middlesex, State of Massachusetts, have invented an Improvement in Shoe-Bottom Fillers, of which the following description is a specification.

The present invention is an improvement on my previous shoe bottom fillers which are capable of being prepared as an article of manufacture, packaged, and sold to the trade in a form capable of being kept without deterioration for such period as may be required before being used, and in which I employ sticky, gummy, pitchy ingredients united with body-giving material in such form as to be self-sustaining as to shape until wanted and then capable of being rendered plastic so as to be molded into a shoe bottom and constitute a tenacious layer meeting the shoemaker's requirements.

Most of my previous fillers require heat for their original mixing and then require heat again for their subsequent manipulation when being placed within the shoe bottoms, some of them, however, being workable cold or without the assistance of heat.

My present invention is derived from my previous application Serial No. 591,207, filed November 7, 1910, patented April 6, 1915, No. 1,134,931, so far as its principal ingredients, advantages, and use are concerned, and, along with said application is subordinate to my basic or foundation filler Patent 832,002 of September 25, 1906.

The present application is restricted in its more specific claims to the tar or tar-like and tarry resinous ingredients such as pine pitches or tar, among which are those known in the trade as Wilmington tar and Stockholm tar and rosins. This material is usually very sticky, dark brown in color, and possesses a rather strong odor, and the ordinary commercial product is unfit for my purpose on these accounts and because commonly too smeary or soft and loaded with impurities such as water and volatile impurities in aqueous solution, bark, pine-needles, wood, etc. I have found that by taking say four parts of this commercial pine tar and two parts of flowers of sulfur, and boiling and heating them until they are thoroughly fluxed, a remarkable change takes place and practically all the objection-
able features (from the standpoint of the requirements of a shoe bottom filler) are eliminated. The water and the over-abundant volatile spirits and impurities are driven off, so that the mass becomes more consistent and is rendered more tenacious and sticky so as to form a practical cementitious medium for the granulated or ground cork or other body-making material of the filler, and the objectionable odor is neutralized or eliminated to such an extent that when mixed with the body material it gives the filler product a more or less leather-like smell (which is very desirable), and the objectionable dark brown color has likewise disappeared. The boiling and purifying of the pine tar eliminates the odor as well as the volatile impurities (the objectionable odor being mainly contained in said impurities), rendering it somewhat darker, however, and the sulfur overcomes this objectionable dark color and produces a clear, opaque sticky, tenacious, strongly adhering gummy mass admirably suited for a shoe bottom filler. The sulfur enters into intimate union with the tar and aids in giving it tenacity and body, so that when the filler has once set it remains set much better than without the sulfur. Having thus prepared this principal ingredient, it is mixed with ground cork or other body-giving material (of the kinds set forth at length in connection with my previous fillers of Patents 832,002, 861,555, 945,294, and 1,032,312) or preferably it is united with other sticky ingredients according to any of the formulae of my previous fillers. All the dark cheap rosins (which are derived from a similar source) have been objectionable for the same reasons, and therefore objectionable and unwelcome to the shoe manufacturer. Attempts to use such ingredients have made the shoe fillers less prepossessing and have cheapened them in the eyes of the trade, so that it has been impossible to use such ingredients. My invention removes all these objections and makes it possible to produce a product with these ingredients which has the light color which is desired by the shoe trade, and an odor which is not objectionable to the shoe trade, and which possesses superior elements of stickiness and permanency.

It is desirable to use with the compounds containing the tar thus treated, stiffening agents such as those set forth in my Patent No. 1,032,312, July 9, 1912, and application Serial No. 705,135, filed June 21, 1912, now Patent 1,121,688 of December 22, 1914. The sulfur in its close union with the tar under the particular process and combination above set forth gives tenacity rather than a mere hardness or stiffening quality. I mention this because the expected effect of sulfur is not only to bleach but to stiffen and harden, whereas in my combination it does not interfere with the stickiness and tenacity of the tar. In fact, if the boiling or melting process is halted promptly so as simply to drive off the odor-bearing volatile constituents, the compound seems to be even stickier than the tar is naturally. For this reason, the stiffening agents aforesaid are specially advantageous in such a filler, particularly the hydrated cements and plasters.

Not only is a prolonged boiling to be avoided for the reason mentioned, but it is liable to stiffen the tar too much and leave it too hard and unyielding. The tar itself can be sufficiently stiffened by boiling alone, and accordingly when it is desired to have the filler very sticky, this can be regulated by the duration of the heating or boiling alone if desired. The sulfur offsets the free melting of the somewhat soft tar, and accordingly the stiffness of the product can be regulated by varying the amount of the sulfur as well as by varying the duration of the heating.

In treating the rosins, as above mentioned, the same method is employed as with the cruder tar. The ordinary commercial pine rosins are very brittle and possess no tenacity, and accordingly I render them pliable by adding oily, very fluid tarry or other chemical softening ingredients such as napththalene whereby they are rendered more tenacious and also sticky and cementitious. The fluxing agent may be any suitable mineral or vegetable oil or naphthalene or glycerin or alizarin oil or crude turpentine, or, as just stated, any soft oily or pitchy tarry mass which will admix with the rosin to render it softer, more pliable, sticky, and otherwise suitable for my purpose of making a shoe bottom filler. To these heated, dark, fluid resinous compounds I add a proportionate amount of sulfur, and thereby produce a product similar to the one made from pine tar alone (with the sulfur). This product has the dark objectionable appearance, odors, etc. eliminated, and the whole mass is converted into a light, opaque, sticky binder to be mixed with the comminuted cork to make an excellent shoe bottom filler.

While my invention is specially advantageous with the rosins mentioned because of their cheapness, it is applicable to the more transparent rosins which are equally benefitted by the admixture therewith of the sulfur (and the other filler-making ingredients if desired) and the boiling, etc. as before. The resulting product becomes still lighter and has become more tenacious, and is of course cheapened.

I have also found that the same treatment and compounding of the darker pitches of vegetable origin and stearic pitches which are offered to the trade in various consistencies and the petroleum pitches such as wax tailings, improves them for the manufacture of shoe bottom fillers by making them lighter and stiffer and giving them body. If the amount of sulfur is increased, care is required to offset the stiffening influence of the sulfur by either selecting a softer basic material or adding enough softening means to render the compounded mass properly tenacious and yet tractable as a binder for the granulated cork. Whenever the petroleum pitches such as wax tailings are fluxed with sulfur, I prefer to use the stickier softer kinds, thereby not only making the color lighter but also serving to stiffen and raise the melting point of the normally low-melting tailings, and thereby rendering them more tenacious.

In defining the sulfur-treated tar as "opaque", I mean that it is of a neutral, silver-grayish body color, as distinguished from being dark brown or blackish.

Having described my invention, what I claim as new and desire to secure by Letters Patent is:

1. A shoe-bottom filler, comprising comminuted chunked, granular body-material intermixed to a doughy, plastic, freely spreadable mass with a binder containing a vegetable tarry component so that each granule is evenly coated with the binder forming a dough-like mass of a consistency normally non-fluid when cold and yet conformable to the foot when in the shoe-bottom.

2. A shoe-bottom filler, comprising comminuted body-material intermixed to a tenacious, doughy, plastic, freely spreadable consistency with a binder containing a wood tarry component and sulfur fluxed together.

3. A shoe-bottom filler, comprising at least in part wood tar concentrated to a tenacious plastic condition and intermixed with granulated cork to a doughy, plastic, self-supporting shoe-bottom filler consistency.

4. A shoe-bottom filler, comprising a binder containing wood tar united with sulfur to a sticky light-colored condition and intermixed to a self-sustaining doughy, tenacious spreadable consistency with comminuted body-material.

5. A shoe-bottom filler, comprising a binder containing resinous material combined with sulfur and all intermixed with comminuted body-material to a stiff, doughy, plastic mass of the consistency of shoe-bottom filler.

6. The herein described process of making a shoe-bottom filler, consisting of lightening the color of a resinous constituent of the filler by fluxing together under heat the resinous material and sulfur until also the tenacity of the product is increased, and thereafter intermixing said product with comminuted body-material for a shoe-bottom filler.

7. The herein described process of making a shoe-bottom filler, consisting of fluxing together under heat a resinous material and sulfur, to the point that it lightens the color and increases the tenacity of the product, adding means as described for softening the resinous material, and thereafter completing said filler by intermixing said product with comminuted body-material.

8. The herein described process of making a shoe-bottom filler, consisting of fluxing together under heat a resinous material and sulfur until the color is lightened and the tenacity is increased, adding an oily softening compound until the product is rendered soft and sticky as required for shoe-bottom filler, and thereafter completing the shoe-bottom filler by intermixing the product with comminuted body-material.

9. The herein described process of making a shoe-bottom filler, consisting of fluxing together under heat a resinous material and sulfur until the color is lightened and the tenacity increased, adding a tarry softening compound until the product attains the softness and stickiness characteristic of shoe-bottom filler, and thereafter completing the shoe-bottom filler by intermixing the product with comminuted body-material.

10. The herein described process of making a shoe-bottom filler, consisting of fluxing together under heat a resinous material and sulfur until the color is lightened and the tenacity increased, adding a restrainer, as described, against subsequent melting when once set, and thereafter completing the shoe-bottom filler by intermixing the product with comminuted body-material.

In testimony whereof, I have signed my name to this specification, in the presence of two subscribing witnesses.

ANDREW THOMA.

Witnesses:
   Geo. H. Maxwell,
   James R. Hodder.